US011128490B2

(12) United States Patent
Motwani et al.

(10) Patent No.: US 11,128,490 B2
(45) Date of Patent: Sep. 21, 2021

(54) ENABLING ACCESS TO DEDICATED RESOURCES IN A VIRTUAL NETWORK USING TOP OF RACK SWITCHES

(71) Applicant: Microsoft Technology Licensing, LLC, Redmond, WA (US)

(72) Inventors: Neeraj Motwani, Sammamish, WA (US); Rishabh Tewari, Sammamish, WA (US); Pranjal Shrivastava, Bellevue, WA (US); Deepak Bansal, Bellevue, WA (US); Vaibhav Kumar, Kirkland, WA (US); Nisheeth Srivastava, Sammamish, WA (US); Abhishek Shukla, Redmond, WA (US); Rangaprasad Narasimhan, Sammamish, WA (US); Vinayak Uppunda Padiyar, Bellevue, WA (US); James Boerner, Marysville, WA (US); Avijit Gupta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/511,606

(22) Filed: Jul. 15, 2019

(65) Prior Publication Data
US 2020/0344089 A1 Oct. 29, 2020

Related U.S. Application Data

(60) Provisional application No. 62/839,435, filed on Apr. 26, 2019.

(51) Int. Cl.
*H04L 12/46* (2006.01)
*H04L 12/66* (2006.01)
(Continued)

(52) U.S. Cl.
CPC ...... *H04L 12/4633* (2013.01); *G06F 9/45558* (2013.01); *H04L 12/4641* (2013.01);
(Continued)

(58) Field of Classification Search
CPC . H04L 12/4633; H04L 12/4641; H04L 12/66; H04L 45/64; H04L 12/46;
(Continued)

(56) References Cited

U.S. PATENT DOCUMENTS 8,880,657 B1 11/2014 Angrish et al.
9,154,416 B2 10/2015 Koganti
(Continued)

OTHER PUBLICATIONS

"HP FlexFabric Reference Architecture Guide", Retrieved from: https://media.zones.com/images/pdf/Reference_Architecture_Guide_HP_FlexFabric.pdf, Apr. 2011, pp. 1-157.
(Continued)

*Primary Examiner* — Tonia L Dollinger
*Assistant Examiner* — Mehulkumar J Shah
(74) *Attorney, Agent, or Firm* — Ranjeev Singh; Singh Law, PLLC

(57) ABSTRACT

Systems and methods for enabling access to dedicated resources in a virtual network using top of rack switches are disclosed. A method includes a virtual filtering platform encapsulating at least one packet, received from a virtual machine, to generate at least one encapsulated packet comprising a virtual network identifier (VNI). The method further includes a TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware portion, and (3) transmitting the at least one decapsulated packet to (Continued)

the dedicated hardware portion based on at least one policy provided by a controller, where the at least one policy comprises information related to a customer of the service provider.

20 Claims, 9 Drawing Sheets

(51) Int. Cl.
  *H04L 12/715* (2013.01)
  *G06F 9/455* (2018.01)
(52) U.S. Cl.
  CPC .............. *H04L 12/66* (2013.01); *H04L 45/64* (2013.01); *G06F 2009/45595* (2013.01)
(58) Field of Classification Search
  CPC . H04L 12/715; H04L 45/745; H04L 12/4645; H04L 45/66; H04L 12/462; G06F 9/4558; G06F 2009/45595; G06F 9/455; G06F 9/5077; G06F 9/45558; G06F 2009/45587
  USPC ......... 709/238; 340/16.1; 370/351; 379/219; 710/316
  See application file for complete search history.

(56) References Cited

U.S. PATENT DOCUMENTS

| | | | |
|---|---|---|---|
| 9,331,940 | B2 | 5/2016 | Balus et al. |
| 9,363,180 | B2 | 6/2016 | Beliveau et al. |
| 9,467,342 | B2 | 10/2016 | Kapadia et al. |
| 9,699,070 | B2 | 7/2017 | Davie et al. |
| 9,979,593 | B2 | 5/2018 | Chanda et al. |
| 2014/0064283 | A1* | 3/2014 | Balus ................ H04L 45/38 370/392 |
| 2015/0010001 | A1 | 1/2015 | Duda et al. |
| 2015/0063353 | A1* | 3/2015 | Kapadia ............ H04L 45/745 370/392 |
| 2015/0124590 | A1 | 5/2015 | Chu et al. |
| 2017/0099188 | A1 | 4/2017 | Chang et al. |
| 2018/0159957 | A1* | 6/2018 | Hooda ............... H04L 45/64 |
| 2018/0295036 | A1* | 10/2018 | Krishnamurthy ... G06F 11/3006 |
| 2019/0028426 | A1 | 1/2019 | Holbrook |
| 2020/0076685 | A1* | 3/2020 | Vaidya .............. H04L 12/4641 |
| 2020/0382420 | A1* | 12/2020 | Suryanarayana ... H04L 12/4641 |

OTHER PUBLICATIONS

"International Search Report and Written Opinion Issued in PCT Application No. PCT/US20/025862", dated Jun. 16, 2020, 11 pages.

\* cited by examiner

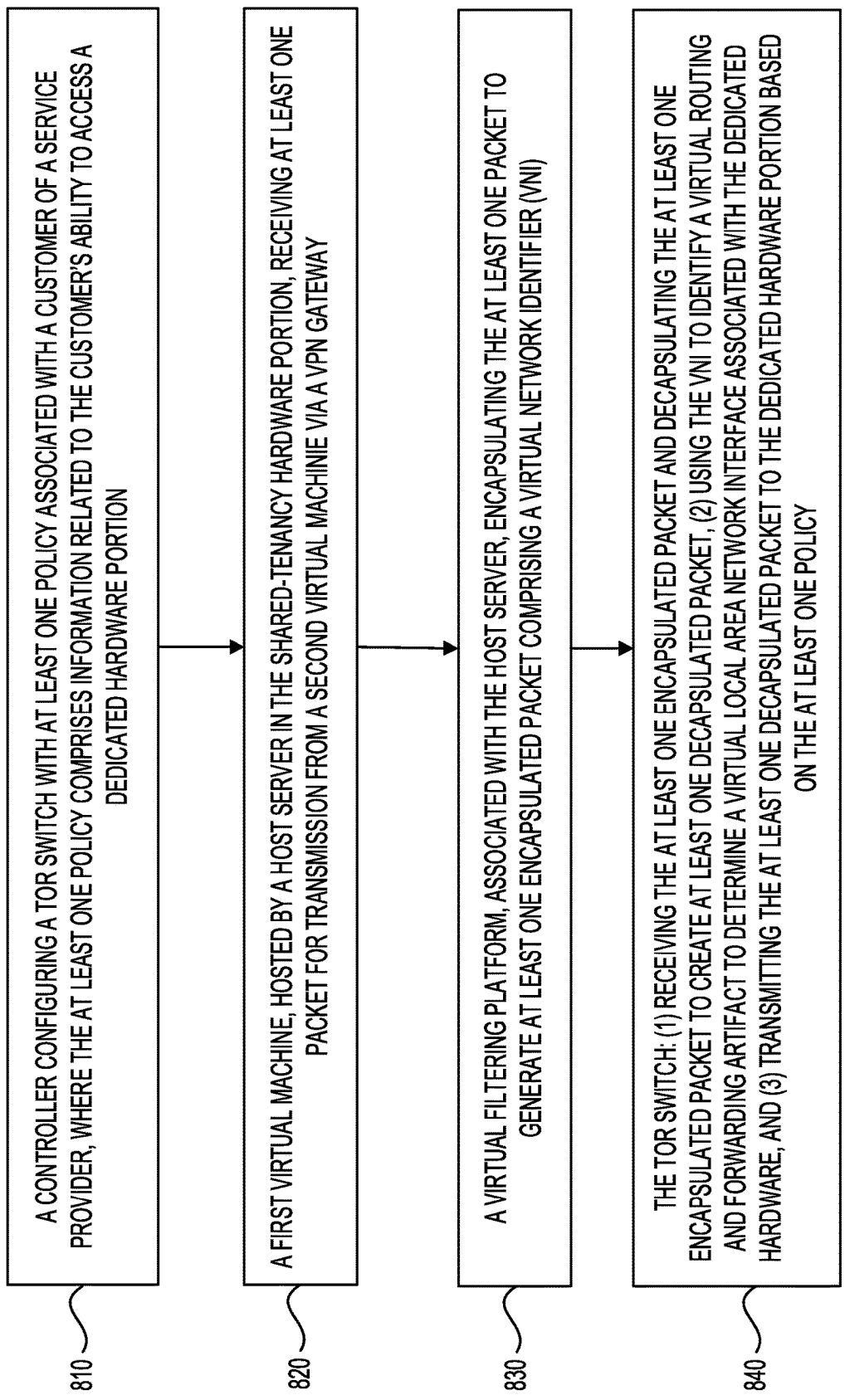

ENABLING ACCESS TO DEDICATED RESOURCES IN A VIRTUAL NETWORK USING TOP OF RACK SWITCHES

CROSS-REFERENCE TO A RELATED APPLICATION

This application claims the benefit of U.S. Provisional Application No. 62/839,435, filed Apr. 26, 2019, titled "ENABLING ACCESS TO DEDICATED RESOURCES IN A VIRTUAL NETWORK USING TOP OF RACK SWITCHES," the entire contents of which are hereby incorporated herein by reference.

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Cloud service providers offer access to these resources by offering cloud computing and storage resources to customers.

At times, customers may want access to not only the cloud resources offered by a cloud service provider, but also access the resources (e.g., storage resources) that are located on the customer's premises and are not part of the storage resources offered by a cloud service provider. Traditionally, the resources located on the customer's premises are connected via a virtual private network to the cloud resources to enable the customer to access resources in both places. These arrangements, however, have several downsides. Thus, there is a need for methods and systems to address these downsides.

SUMMARY

In one aspect of the present disclosure relates to a method in a distributed computing system, offered by a service provider, comprising a shared-tenancy hardware portion and a dedicated hardware portion, where the shared-tenancy hardware portion is coupled to the dedicated hardware portion via a top of rack (TOR) switch, where the distributed computing system further comprises a virtual machine, hosted by a host server in the shared-tenancy hardware portion. The method may include a virtual filtering platform, associated with the host server, encapsulating at least one packet, received from the virtual machine, to generate at least one encapsulated packet comprising a virtual network identifier (VNI). The method may further include the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware, and (3) transmitting the at least one decapsulated packet to the dedicated hardware portion based on at least one policy provided by a controller, where the at least one policy comprises information related to a customer of the service provider including information about the customer's ability to access the dedicated hardware portion.

In another aspect, the present disclosure relates to distributed computing system, which may be offered by a service provider. The distributed computing system may include a shared-tenancy hardware portion comprising a host server. The distributed computing system may further include a dedicated hardware portion comprising a baremetal server. The distributed computing system may further include a top of rack (TOR) switch configured to allow exchange of packets between the shared-tenancy hardware portion and the dedicated hardware portion, where the TOR switch is configured to allow the exchange of packets based on at least one policy specified by a controller associated with the shared-tenancy hardware portion. The distributed computing system may further include a virtual machine hosted by the host server configured to create at least one packet for transmission to the dedicated hardware portion. The distributed computing system may further include a virtual filtering platform, associated with the host server, configured to process the at least one packet and generate an encapsulated packet comprising a virtual network identifier (VNI). In the distributed computing system the TOR switch may further be configure to: (1) receive the at least one encapsulated packet and decapsulate the at least one encapsulated packet to create at least one decapsulated packet, (2) use the VNI to identify a virtual routing and forwarding artifact to determine a virtual local area network interface associated with the dedicated hardware, and (3) transmit the at least one decapsulated packet to the dedicated hardware portion based on the at least one policy.

In yet another aspect, the present disclosure relates to a method in a distributed computing system, offered by a service provider, comprising a shared-tenancy hardware portion and a dedicated hardware portion, where the shared-tenancy hardware portion is coupled to the dedicated hardware portion via a top of rack (TOR) switch, where the distributed computing system further comprises a first virtual machine, hosted by a host server in the shared-tenancy hardware portion, and a second virtual machine coupled to the first virtual machine via a virtual-private network (VPN) gateway. The method may include a virtual filtering platform, associated with the host server, encapsulating at least one packet, received from the first virtual machine, to generate at least one encapsulated packet comprising a virtual network identifier (VNI). The method may further include the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware, and (3) transmitting the at least one decapsulated packet to the dedicated hardware portion based on at least one policy provided by a controller, where the at least one policy comprises information related to a customer of the service provider including information about the customer's ability to access the dedicated hardware portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 8 shows another flowchart of a method for enforcing policies provided by the SON controller in accordance with one example.

DETAILED DESCRIPTION

Examples described in this disclosure relate to enforcing policies (e.g., isolation policies) using Top of Rack (TOR) switches to enable access to dedicated resources (e.g., dedicated storage). In traditional virtual networks provided by cloud providers, network level policies, including isolation policies, are enforced on hosted containers or virtual machines. This approach restricts the transparent use of the customer's own dedicated hardware, which may be located on the customer's premises or elsewhere. This is because typically the dedicated hardware is connected to the cloud provider's resources via a virtual private network. This arrangement increases the latency associated with the data traffic that originates from the dedicated hardware or is destined for the dedicated hardware.

In addition, since the dedicated hardware can be used for various purposes and can be provided by different manufacturers, it's not possible to apply uniform network level policies, including isolation policies, to the dedicated hardware. In one example, the present disclosure ensures the application of uniform policies, without sustaining increased latencies, by attaching the dedicated hardware to a programmable Top of Rack (TOR) switch and creating a virtual network interface on the TOR switch, which can be part of a given virtual network representing the hardware. With this approach, the network interface attached to the dedicated hardware is part of the virtual network; and, is not part of the dedicated hardware device alone. In one example, multiple such virtual interfaces can be created and attached to the same hardware, and thus network level policies, including isolation policies, can be enforced at the TOR switch level.

In one example, the isolation policy is enforced by a software defined network (SDN) controller, which is configured to maintain an inventory of the attached resources to a TOR switch; and based on this inventory, the SDN is configured to allocate a unique VLAN for each unique virtual network associated with the TOR switch. In this example, the SDN controller is also configured to program the TOR switch with other policies as well, including policies, such as on-premise connectivity, access control lists (ACLs), next hop routes, or the like.

Certain aspects of the disclosure: (1) enable customers to provision storage space or other types of resources on third-party vendor appliances; (2) enable multi-tenancy in the network to isolate storage resources or other types of resources on third-party vendor appliances; and (3) enable higher throughput and lower latency between cloud-hosted virtual machines (VMs) and third-party vendor appliances.

Figure 1:
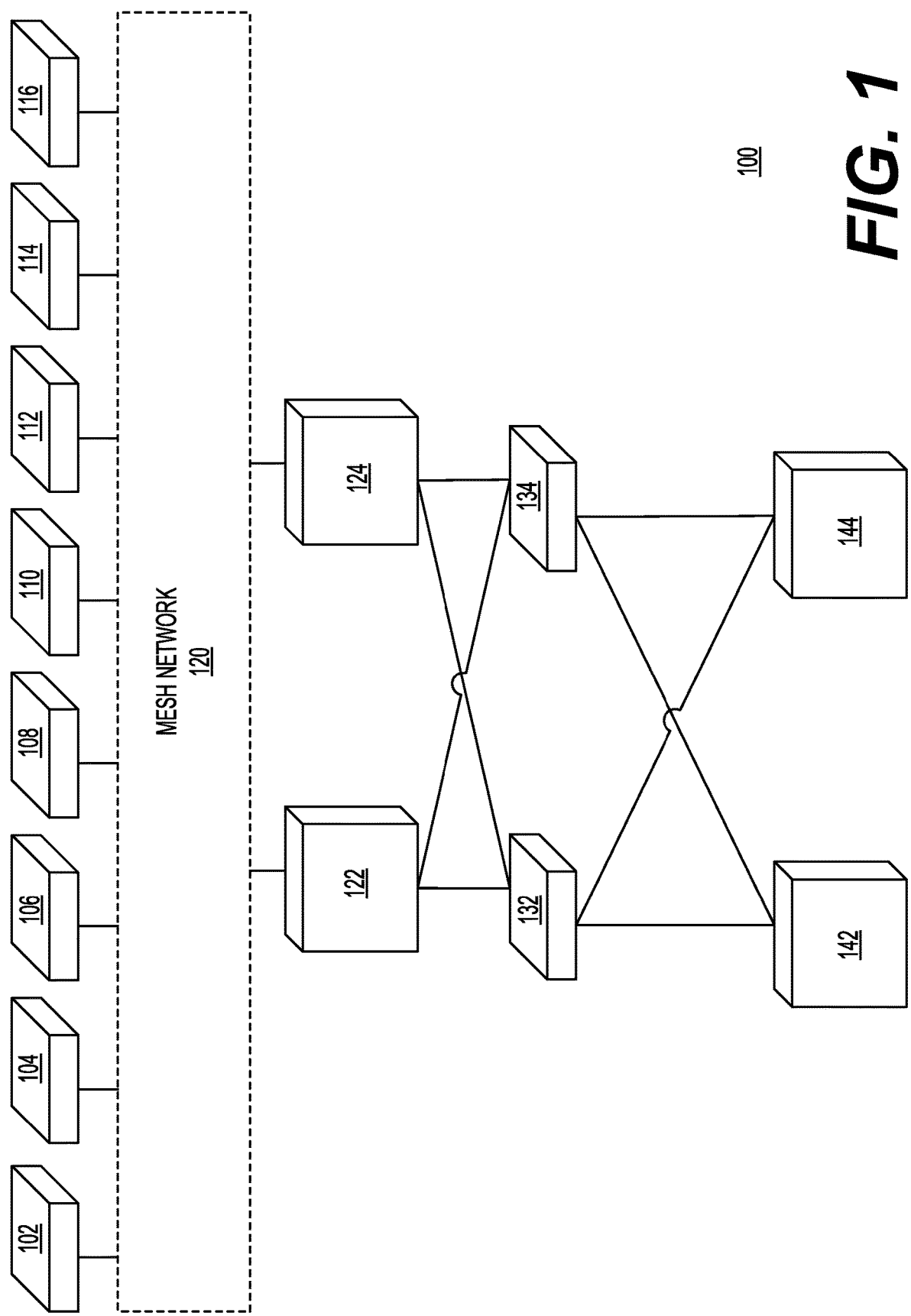
FIG. 1 shows a network architecture for implementing certain aspects of the present disclosure in accordance with one example.

In one example, certain aspects of the present disclosure may be implemented in a data center that uses a network architecture with servers that are segmented based on their location. FIG. 1 shows a network architecture 100 for implementing certain aspects of the present disclosure in accordance with one example. Network architecture 100 may include networking components to enable the organization of computer and storage resources in clusters and racks. An example data center may include several clusters of racks including platform hardware, such as server nodes, storage nodes, networking nodes, or other types of nodes. Server nodes may be connected to switches 102, 104, 106, 108, 110, 112, 114, and 116 in the leaf layer. The switches in the leaf layer may be connected to switches 122 and 124 in the spine layer via a mesh network 120. Mesh network 120 may enable connections between each possible combination of switches, including among the switches in the leaf layer and the switches in the spine layer. In one example, switches 122 and 124 may aggregate the traffic from and to the server nodes (not shown) coupled to the switches in the leaf layer. Switches 122 and 124 may be coupled to Top of Rack (TOR) switch 132 and 134, as shown in FIG. 1. Each of TOR switch 132 and 134 may be coupled to inter-cluster switches 142 and 144, respectively. Although FIG. 1 shows network architecture 100 with a certain arrangement of switches and layers, there could be more or fewer number of switches and layers arranged differently.

In one example, network architecture 100 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). The VNI may identify the scope of the inner MAC frame originated by the individual VM. The VNI may act as an outer header that encapsulates the inner Media Access Control (MAC) address originated by the VM. In this example, the encapsulation allows a UDP tunneling scheme to overlay Layer 2 networks on top of Layer 3 networks. VXLAN segments may be identified by a virtual network identifier (VNI). The endpoint of the tunnel, referred to as the VXLAN Tunnel End Point (VTEP), may be located within the hypervisor on the server that hosts the VM. VTEPs may be implemented in software or hardware or a combination of the both software and hardware.

The VXLAN may be controlled using a control plane option. In this example, the VXLAN control plane may be managed using the SDN controller. In this example, the SDN controller may manage the VXLAN tables that may contain the VNINLAN mapping information. Each VM, or the like, may include VTEPs so that they can encapsulate/decapsulate the packets based on the instructions contained in the VXLAN tables.

Figure 2:
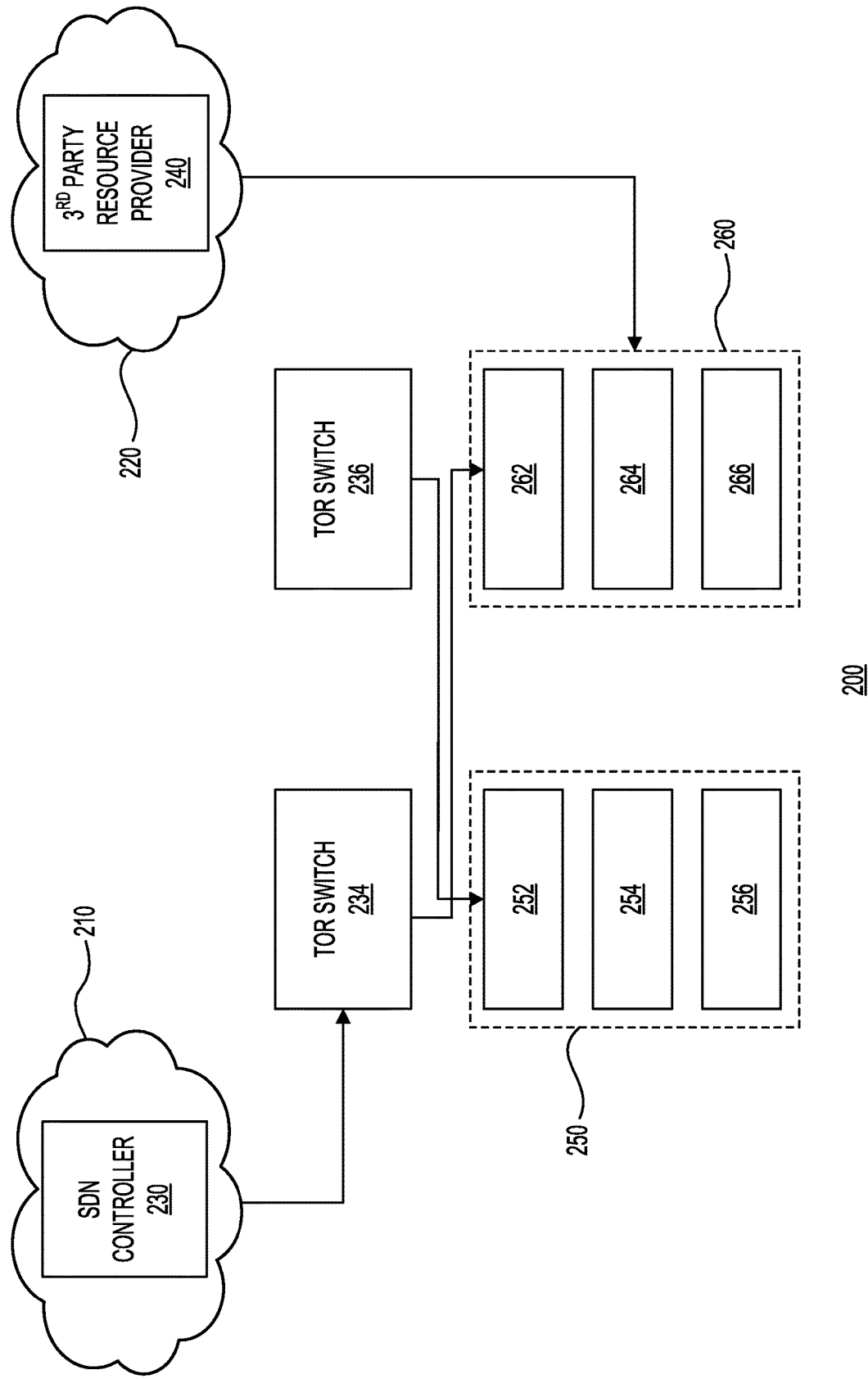
FIG. 2 shows an example distributed computing system for implementing certain aspects of the present disclosure in accordance with one example.

FIG. 2 shows an example distributed computing system 200 for implementing certain aspects of the present disclosure in accordance with one example. Distributed computing system 200 may include cloud portion 210 and cloud portion 220. Cloud portion 210 may include hardware severs (e.g., in a portion of a data center or other such arrangements) that are managed and controlled by a cloud service provider and cloud portion 220 may include hardware servers (e.g., a portion of a data center or other such arrangements) managed and controlled by a third-party in agreement with the cloud service provider. Cloud portion 210 may include a software defined network (SDN) controller 230. SDN controller 230 may be coupled to third-party hardware 250 (e.g., dedicated hardware for the use of a specific customer or a set of customers that share the dedicated hardware) and third-party hardware 260. Third-party hardware 250 may include hardware components 252, 254, and 256. Third-party hardware 260 may include hardware components 262, 264, and 266. Each of these components may be baremetal servers, storage servers, or other types of resources that are dedicated hardware for a specific customer.

With continued reference to FIG. 2, cloud portion 220 may include a $3^{rd}$ party resource provider 240, which may be used to deploy third-party resources. SDN controller 230 may be coupled to TOR switches that may be configured using SDN controller 230. Thus, in this example, SDN controller 230 may be coupled to TOR switch 234 and TOR switch 236. TOR switch 234 may be coupled to third-party hardware 260 and TOR switch 236 may be coupled to third-party hardware 250. SDN controller 230, which may be implemented as a cloud infrastructure service, may be responsible for configuring TOR switch 234 and TOR switch 236 with the isolation and other policies. In this example, SDN controller 230 may also be used to configure different virtual networks associated with the customers. In one example, virtual networks may allow a customer to define their own private network, with its own private IP address, despite running on a share multi-tenant cloud infrastructure. In one example, SDN controller 230 may be used to program the network isolation policies for the virtual networks associated with respective customers. Although FIG. 2 shows a single SDN controller, cloud portion 210 may include several SDN controllers that could be used to program various policies associated with cloud portion 210.

Figure 3:
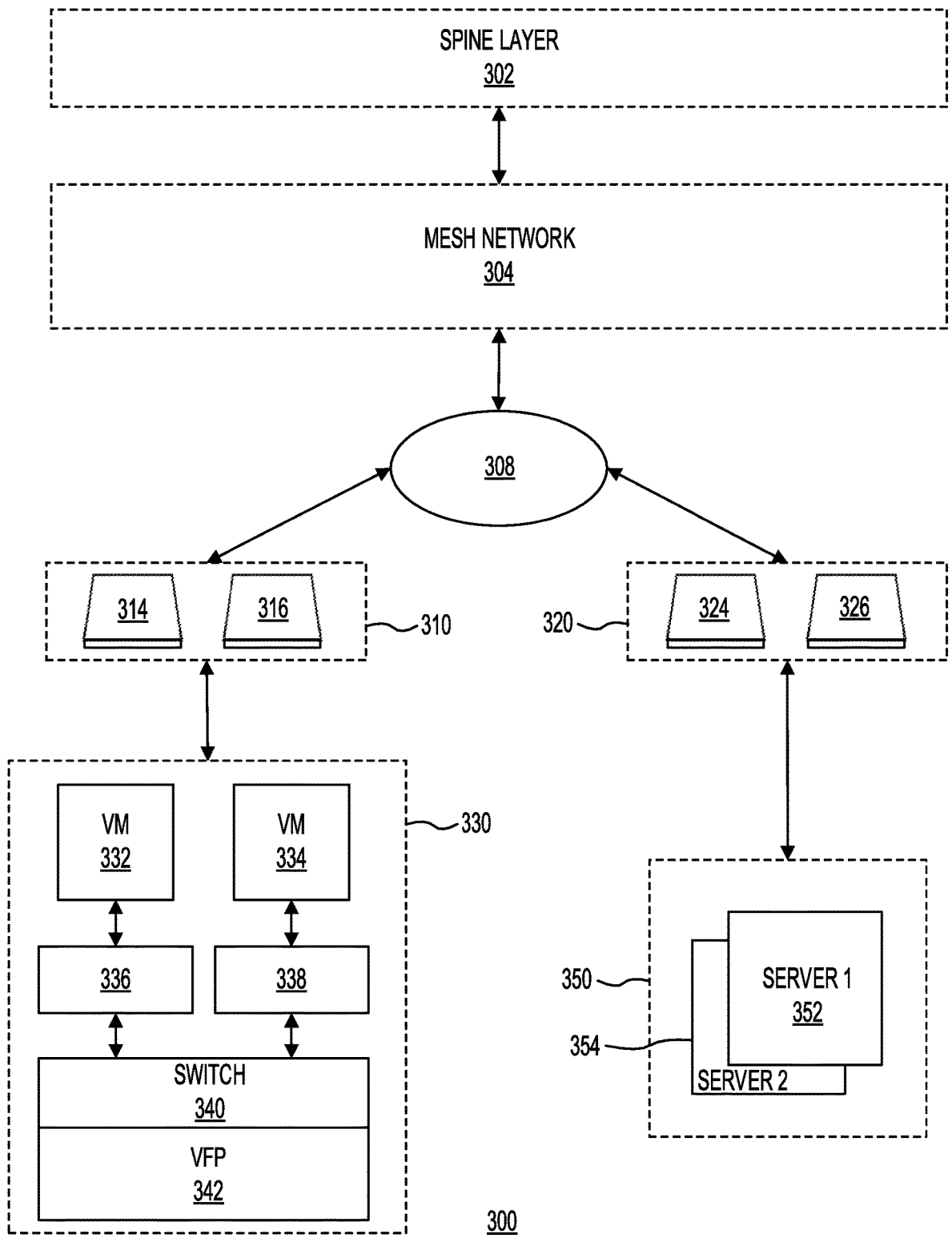
FIG. 3 shows a data center including a shared-tenancy hardware portion and a dedicated hardware portion in accordance with one example.

FIG. 3 shows a data center 300 including a shared-tenancy hardware portion 330 and a dedicated hardware portion 350. In this example, VXLANs may be used to allow communication between shared-tenancy hardware portion 330 and dedicated hardware portion 350 in compliance with the requisite policies. Data center 300 may include a spine layer 302 and a mesh network 304. As explained earlier with respect to FIG. 1, spine layer 302 may include switches connected to mesh network 304. Mesh network 304 may be connected to other routers and switches in the leaf layer including leaf layer portion 310 and leaf layer portion 320. Other types of switching arrangements may also be used to enable communication in data center 300. In this example, leaf layer portion 310 may include switches 314 and 316, which may be coupled to TOR switch 308, which may be coupled to mesh network 304. In addition, in this example, leaf layer portion 320 may include switches 324 and 326, which may also be coupled to TOR switch 308. In this example, TOR switch 308 may present two switched virtual interfaces (SVIs). The two SVIs may be coupled to the switches in spine layer 302 via appropriate links or networks (e.g., mesh network 304).

With continued reference to FIG. 3, leaf layer portion 310 may be coupled to cloud portion 330 and leaf layer portion 320 may be coupled to cloud portion 350. In this example, cloud portion 330 may include hardware severs (e.g., in a portion of a data center or other such arrangements) that are managed and controlled by a cloud service provider and cloud portion 350 may include hardware servers (e.g., a portion of a data center or other such arrangements) managed and controlled by a third-party in agreement with the cloud service provider. Cloud portion 330 may include virtual machines (VMs) 332 and 334, which may be provisioned using hardware associated with cloud portion 330. Each VM may have a corresponding IP address. Thus, VM 332 may correspond to IP address 192.168.10.3 and VM 334 may correspond to IP address 192.168.10.2. Each VM may communicate with a switch (e.g., switch 340) using a network interface controller (NIC). Thus, VM 332 may be coupled to switch 340 via NIC 336 and VM 334 may be coupled to switch 340 via NIC 338. As noted earlier, switch 340 may be implemented as a Hyper-V Extensible Switch. Switch 340 may further be coupled a virtual filtering platform (VFP) 342. VFP 342 may operate as a packet filter such that VFP 342 may filter traffic from NIC 336 and NIC 338 to switch 340 and vice-versa. Each VM may be allowed to communicate with VMs in the same Virtual eXtensible Local Area Network (VXLAN) segment.

In certain examples, the routing between the VXLAN segments may be accomplished using a multi-chassis link aggregation scheme. Thus, the topology of data center 300 may include both logical VTEPs and virtual VTEPs. As an example, a logical VTEP may correspond to the multi-chassis link aggregation group (MLAG) domain for a first rack (e.g., Rack 1) and the other logical VTEP may correspond to the MLAG domain for a second rack (e.g., Rack 2). An address resolution protocol (ARP) request with an anycast IP address could result in potentially both VTEPs responding to the VRP request. To avoid this problem and to ensure a single VTEP responds to the ARP request, the virtual VTEP functionality is used. This may allow the virtual MAC to sit behind a single virtual VTEP, which is shared across the leaf switches having the same anycast IP address. Thus, in data center 300 switches 314 and 316 may share the same virtual VTEP. Similarly, switches 324 and 326 may share the virtual VTEP. In this example, the ARP requests to the virtual MAC are replied to only when the requests are sent to the virtual VTEP rather than to the logical VTEPs. In this example, the virtual VTEP is added to the head end replication (HER) flood list ensuring that the ARP requests are forwarded to the virtual VTEP.

Still referring to FIG. 3, cloud portion 350 may include a sever 1 352 and a server 2 354. These servers may be coupled to leaf layer portion 320. These severs may correspond to dedicated hardware for a specific customer. In one example, a particular VXLAN segment may correspond to a virtual network (VNET) associated with the customer. Thus, the VNET may also be associated with a virtual network identifier (VNI). In this example, it is assumed that the VNI of the VNET associated with the customer is 73456. With respect to FIG. 3, in one example, it is assumed that the customer's virtual network is VNET01 and it corresponds to the IP space that includes the following IP addresses: 192.168.10.0/24, 192.168.11.0.24. In this example, it is assumed that one of the customer's server (e.g., a baremetal server identified as sever 1 352 in FIG. 3) may have an IP address of 192.168.11.2. The baremetal server's MAC address may be 00:12:35:43:A1:9D. At least one of the VM's (e.g., VM 332) may have an IP address of 192.168.10.2 and the corresponding MAC address may be 00:12:23:54:A2:9F. The physical address of the host server in cloud portion 330 may be 10.100.2.4. (cloud service provider's physical network routable IP address). The physical address of TOR switch 308 may be 10.100.10.10.

Still referring to FIG. 3, when VM 332 sends a package to sever 1 352, VFP 342 may encapsulate this packet with a VXLAN header that includes the IP address of the host server (e.g., 10.100.2.4) as the source IP address and the IP address (e.g., 10.100.10.10) of TOR switch 308 as the destination IP address. TOR switch 308 may decapsulate the encapsulated packet and use the VNI in the packet to identify the virtual routing and forwarding (VRF) on the switch. TOR switch 308 may do this by mapping the VNI in the packet to the specific VRF artifact (e.g., a VRF table) for that customer. The VRF artifact may contain configuration specific to the customer's VNET. In the opposite direction, when sever 1 352 sends the packet to the VM (e.g., VM 332), it may tag the packet with a specific VXLAN tag. Once the packet reaches a TOR switch (e.g., TOR switch 308), it may use the VXLAN tag to find the VRF artifact, which contains the routes to the VM in the customer's VNET. Although FIG. 3 shows a certain number of components arranged in a certain manner, additional or fewer components may be included and they may be arranged differently. As an example, although FIG. 3 shows a single TOR switch (TOR switch 308), multiple TOR switches may be interconnected to allow the exchange of traffic between cloud portion 330 and cloud portion 350. In addition, although FIG. 3 shows sever 1 352 and server 2 354 in cloud portion 350, they may be incorporated in cloud portion 330 and connected via at least one TOR switch that may be used to provide similar functionality as TOR switch 308. Additional details concerning the packet flow are provided in FIGS. 4A and 4B.

Figure 4A:
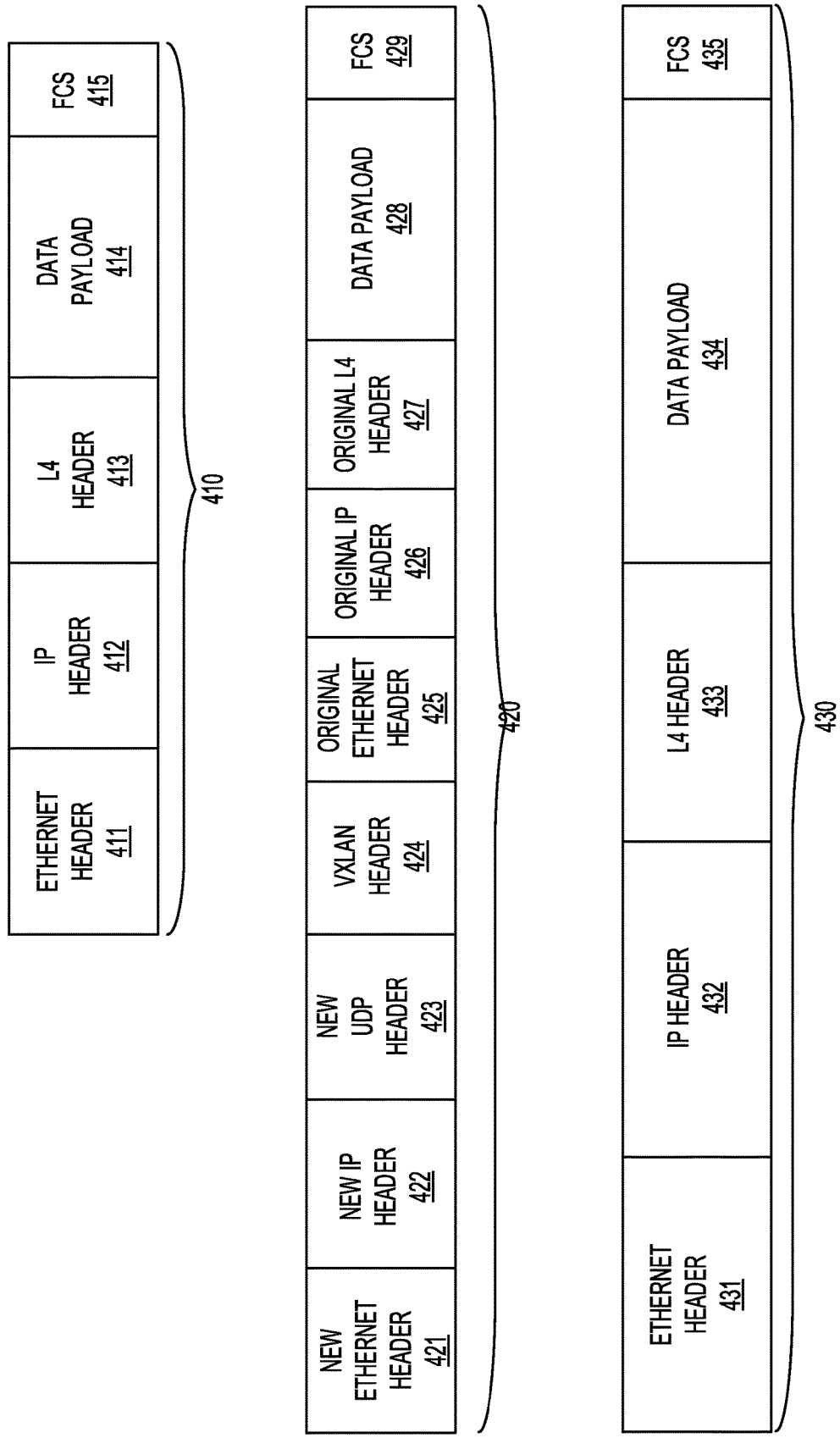
FIG. 4A shows packet flow from a host server in a cloud portion to at least one of the dedicated servers in accordance with one example.

FIG. 4A shows packet flow 400 from host server in a cloud portion 330 to at least one of the dedicated servers (e.g., sever 1 352). Any one of VM 332 or VM 334 may send packets to the dedicated server. As an example, original packet 410 may include Ethernet Header 411, IP Header 412, Layer 4 (L4) Header 413, Data Payload 414, and frame check sequence (FCS) 415. In this example, the packet flow corresponds to packets from VM 332 of FIG. 3 to sever 1 352 of FIG. 3. VM 332 may initiate the original packet (e.g., original packet 410) and include the source IP address of the VM (e.g., 192.168.10.2) and the destination IP address of sever 1 352 (e.g., 192.168.11.2) in IP Header 412. VFP 342 may encapsulate the original packet from any of the VMs with a VXLAN header to create encapsulated packet 420. Encapsulated packet 420 may include the following fields: New Ethernet Header 421, New IP Header 422, New UDP Header 423, VXLAN Header 424, Original Ethernet Header 425, Original IP Header 426, Original L4 Header 427, Data Payload 428, and FCS 429. Thus, in one example, VFP 342 may add VXLAN Header 424, including the VNI (e.g., as per the earlier description a VNI value of 73456). When the encapsulated packet (e.g., encapsulated packet 420) reaches the TOR (e.g., TOR switch 308 of FIG. 3), the encapsulated packet may be decapsulated by TOR switch 308. TOR switch 308 may use the VNI find the VRF artifact, which may be the logical space (e.g., a table) used for storing the configuration information for a particular customer (the customer associated with the VNI). TOR switch 308 may learn the MAC address of the destination (e.g., 192.168.11.2) through the address resolution protocol (ARP) and route the decapsulated packet to sever 1 352 via the configured VXLAN interface (e.g., the switched virtual interfaces described earlier). In this example, as shown in FIG. 4A, decapsulated packet 430 may include Ethernet Header 431, IP Header 432, L4 Header 433, Data Payload 434, and FCS 435. Table 1 below shows an example VRF table for use by TOR switch 308.

TABLE 1 interface Vlan80
    description VNET:4c8eace0-2177-4537-8a49-62da3db07ea8
    Interface:713c8e08-918b-40c3-9bcf-0d7a740f631a
        vrf forwarding VNET-4c8eace0-2177-4537-8a49-62da3db07ea8
        ip address 192.168.11.2./24
        ip access-group block_infra_vxlan_nvgre in
        ip virtual-router address 192.168.11.1

Although Table 1 shows a certain arrangement of information for the VRF artifact, other arrangements or data structures may also be used. Although FIG. 4A shows original packet 410 with certain fields arranged in a certain manner, original packet 410 may include fewer or additional fields arranged differently. As an example, L4 Header 413 may not be included in the original packet. Similarly, other packets may have fewer or additional fields arranged differently.

Figure 4B:
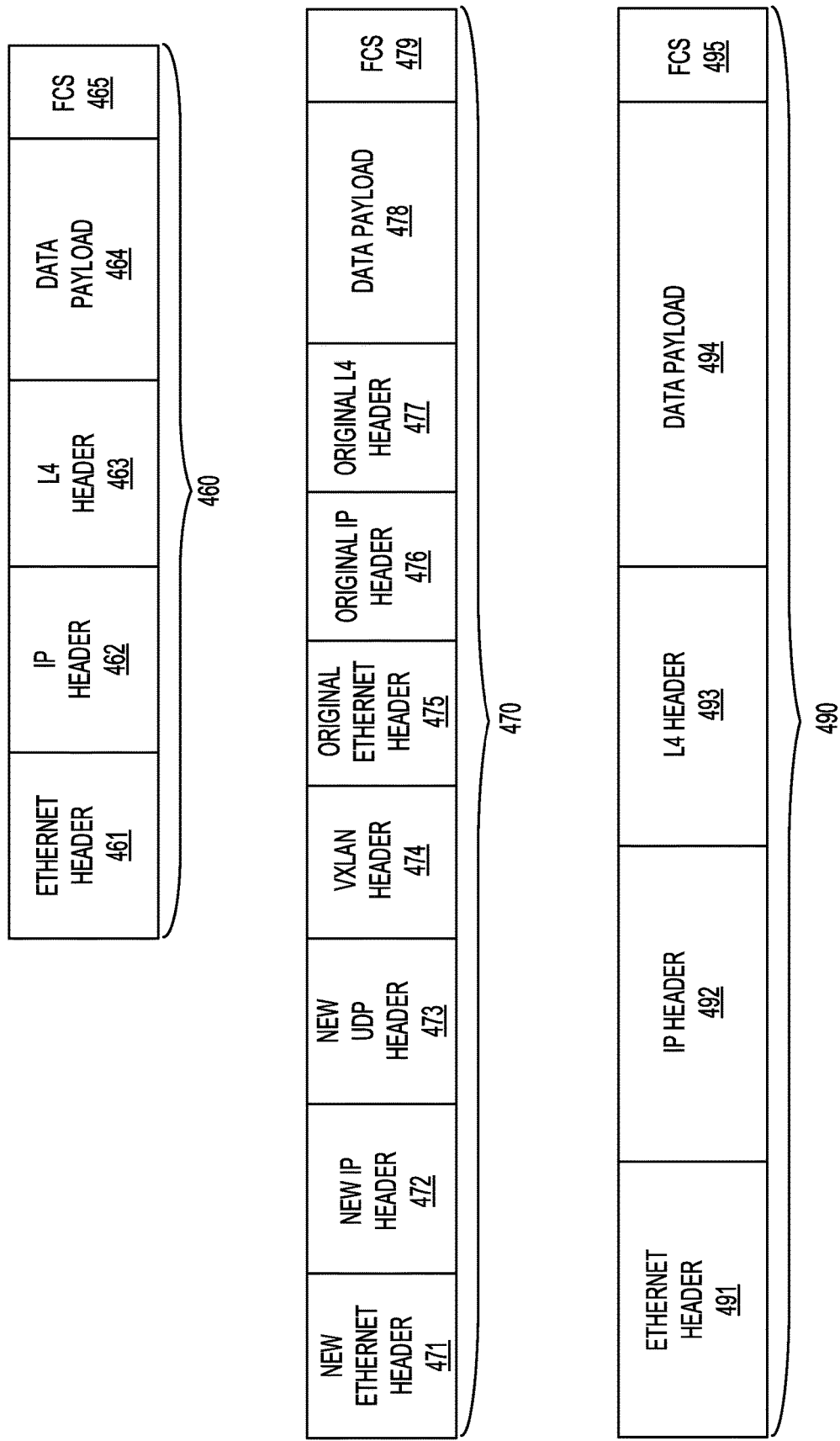
FIG. 4B shows packet flow from at least one the dedicated servers to a host server included in a cloud portion in accordance with one example.

FIG. 4B shows packet flow 450 from the dedicated server (e.g., sever 1 352 of FIG. 3) to a host server included in cloud portion 330. As an example, original packet 460 may include Ethernet Header 461, IP Header 462, Layer 4 (L4) Header 463, Data Payload 464, and frame check sequence (FCS) 465. In this example, the packet flow corresponds to packets from sever 1 352 of FIG. 3 to VM 332 of FIG. 3. Server 1 352 may initiate the original packet (e.g., original packet 460) and may include VLAN:80 in Ethernet Header 461 field. In this example, VLAN:80 may correspond to the VXLAN interface of TOR switch 308. Once the packet is received by TOR switch 308, it may access the route information to route the packet further. Thus, in this example, TOR switch 308 may identify the VRF artifact that contains the routes to the correct VM in the customer virtual network. Server 1 352 may also include the source IP address of the server (e.g., 192.168.11.2) and the destination IP address of VM 332 (e.g., 192.168.10.2) in IP Header 462. In this example, based on the assumptions described earlier, the VRF artifact may be structured as shown in Table 2 below:

TABLE 2 ip route vrf VNET-4c8eace0-2177-4537-8a49-62da3db07ea8
    192.168.10.2/32
    vtep 10.100.2.4 vni 73456 router-mac-address 00:12:23:54:A2:9F Thus, in this example, the original packet is destined for VM 332 (IP address 192.168.10.2), and TOR switch 308 may encapsulate original packet 460 to generate encapsulated packet 470. Encapsulated packet 470 may include the following fields: New Ethernet Header 471, New IP Header 472, New UDP Header 473, VXLAN Header 474, Original Ethernet Header 475, Original IP Header 476, Original L4 Header 477, Data Payload 478, and FCS 479. TOR switch 308 may set New IP Header 472 to include the IP address of 10.100.2.4, which, in this example, corresponds to the routable IP address of the host server hosting VM 332. TOR switch 308 may also include VNI 73456 (the unique identifier of the VNET) in VXLAN Header 474. Since there is no address resolution (i.e., ARP) between VM 332 and TOR switch 308, in this example the route may be configured with the MAC of the VM (e.g., 00:12:23:54:A2:9F). TOR switch 308 may insert this MAC as the destination MAC in Original Ethernet Header 475 field. When encapsulated packet 470 reaches the host server hosting VM 332, VFP 342 may decapsulate encapsulated packet 470 to generate decapsulated packet 490 and switch it to VM 332. As shown in FIG. 4B, decapsulated packet 490 may include Ethernet Header 491, IP Header 492, L4 Header 493, Data Payload 494, and FCS 495. Although FIG. 4B shows original packet 460 with certain fields arranged in a certain manner, original packet 460 may include fewer or additional fields arranged differently. As an example, L4 Header 463 may not be included in the original packet. Similarly, other packets may have fewer or additional fields arranged differently.

Figure 5:
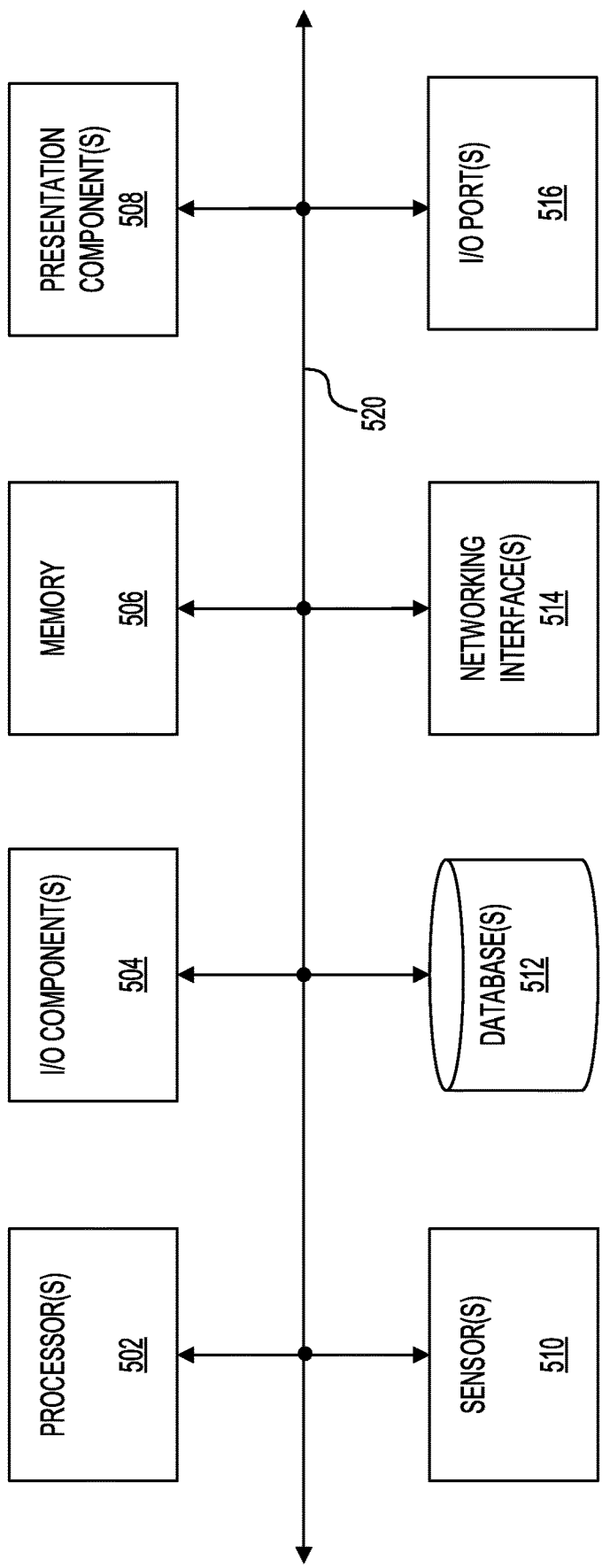
FIG. 5 shows a computing platform that may be used for implementing at least some of the functionality of a software defined network (SDN) controller, a $3^{rd}$ party resource provider, a virtual filtering platform (VFP), and policy enforcement by TOR switches in accordance with one example.

FIG. 5 shows a computing platform 500 that may be used for implementing at least some of the functionality of SDN controller 230, 3$^{rd}$ Party Resource Provider 240, VFP 342, and policy enforcement by TOR switches in accordance with one example. Computing platform 500 may include processor(s) 502, I/O component(s) 504, memory 506, presentation component(s) 508, sensor(s) 510, database(s) 512, networking interface(s) 514, and I/O port(s) 516, which may be interconnected via bus 520. Processor(s) 502 may execute instructions stored in memory 506. The instructions may correspond to either one of the SDN controller 230, 3$^{rd}$ Party Resource Provider 240, VFP 342, and policy enforcement by TOR switches. I/O component(s) 504 may include components such as a keyboard, a mouse, a voice recognition processor, or touch screens. Memory 506 may be any combination of non-volatile storage or volatile storage (e.g., flash memory, DRAM, SRAM, or other types of memories). Presentation component(s) 508 may be any type of display, such as LCD, LED, or other types of display, or other types of output components, including audio or haptic output components.

With continued reference to FIG. 5, database(s) 512 may be used to store records related to the enforcement of the policies. In addition, database(s) 512 may also store data used for generating reports related to the enforcement of the policies, including any compliance related reports. Networking interface(s) 514 may include communication interfaces, such as Ethernet, cellular radio, Bluetooth radio, UWB radio, or other types of wireless or wired communication interfaces. I/O port(s) 516 may allow computing platform 500 to communicate with bus 520 or other I/O component(s) 504. Although FIG. 5 shows computing platform 500 as including a certain number of components arranged and coupled in a certain way, it may include fewer or additional components arranged and coupled differently. In addition, the functionality associated with computing platform 500 may be distributed or combined, as needed. Moreover, not all of the aspects of computing platform 500 may be needed to implement each of SDN controller 230, 3$^{rd}$ Party Resource Provider 240, VFP 342, and policy enforcement by TOR switches.

Figure 6:
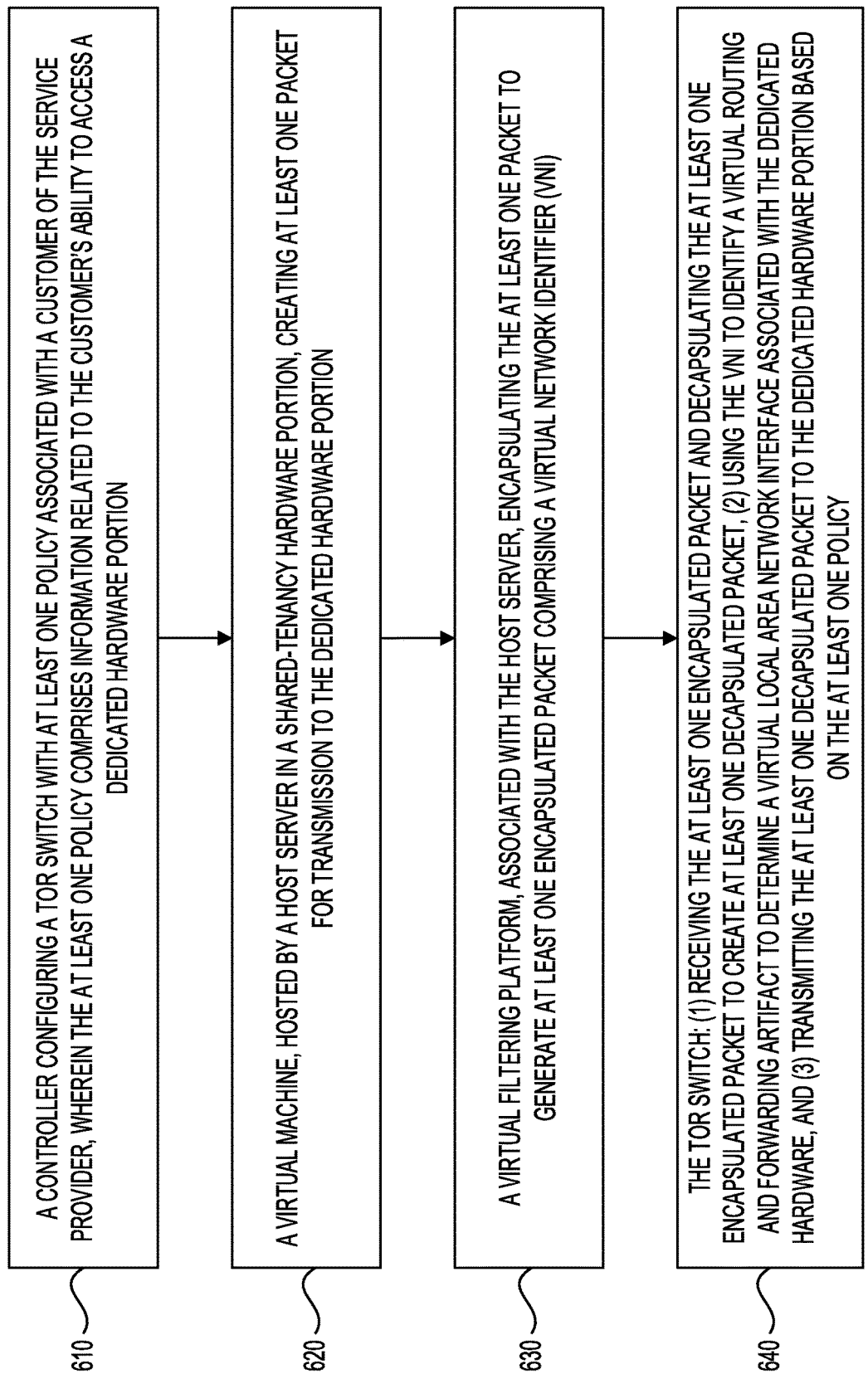
FIG. 6 shows a flowchart of a method for enforcing policies provided by the SDN controller in accordance with one example.

FIG. 6 shows a flowchart 600 of a method in accordance with one example. In this example, this method may be performed in a distributed computing system including a shared-tenancy hardware portion and a dedicated hardware portion, where the shared-tenancy hardware portion may be coupled to the dedicated hardware portion via a top of rack (TOR) switch. As an example, this method may be performed in data center 300. Step 610 may include a controller configuring the TOR switch with at least one policy associated with a customer of the service provider, where the at least one policy comprises information related to the customer's ability to access the dedicated hardware portion. As an example, SDN controller 230 of may be used to configure a TOR switch (e.g., TOR switch 308 of FIG. 3) with a policy associated with a customer's ability to access dedicated hardware (e.g., sever 1 352 of FIG. 3).

Step 620 may include a virtual machine, hosted by a host server in the shared-tenancy hardware portion, creating at least one packet for transmission to the dedicated hardware portion. As an example, VM 332 of FIG. 3 may create the packet for transmission to sever 1 352 of FIG. 3. The at least one packet may be similar in structure to original packet 410 of FIG. 4A.

Step 630 may include a virtual filtering platform, associated with the host server, encapsulating the at least one packet to generate at least one encapsulated packet comprising a virtual network identifier (VNI). As an example, VFP 342 of FIG. 3 may encapsulate original packet 410 to generate an encapsulated packet 420 of FIG. 4A including the VNI in VXLAN Header 424 field.

Step 640 may include the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware, and (3) transmitting the at least one decapsulated packet to the dedicated hardware portion based on the at least one policy. As an example, TOR switch 308 of FIG. 3 may receive the encapsulated packet and decapsulate the packet to create decapsulated packet 430 of FIG. 4. TOR switch 308 may further use the VNI in VXLAN Header 424 to identity the VRF artifact to determine a VLAN interface (e.g., an SVI) associated with the dedicated hardware (e.g., sever 1 352 of FIG. 3). TOR switch 308 may further transmit the decapsulated packet to the dedicated hardware portion as long as the policy specified by the SDN controller allows such an action. This way, policies may be enforced, yet high throughput and low latency exchange of information may occur.

Figure 7:
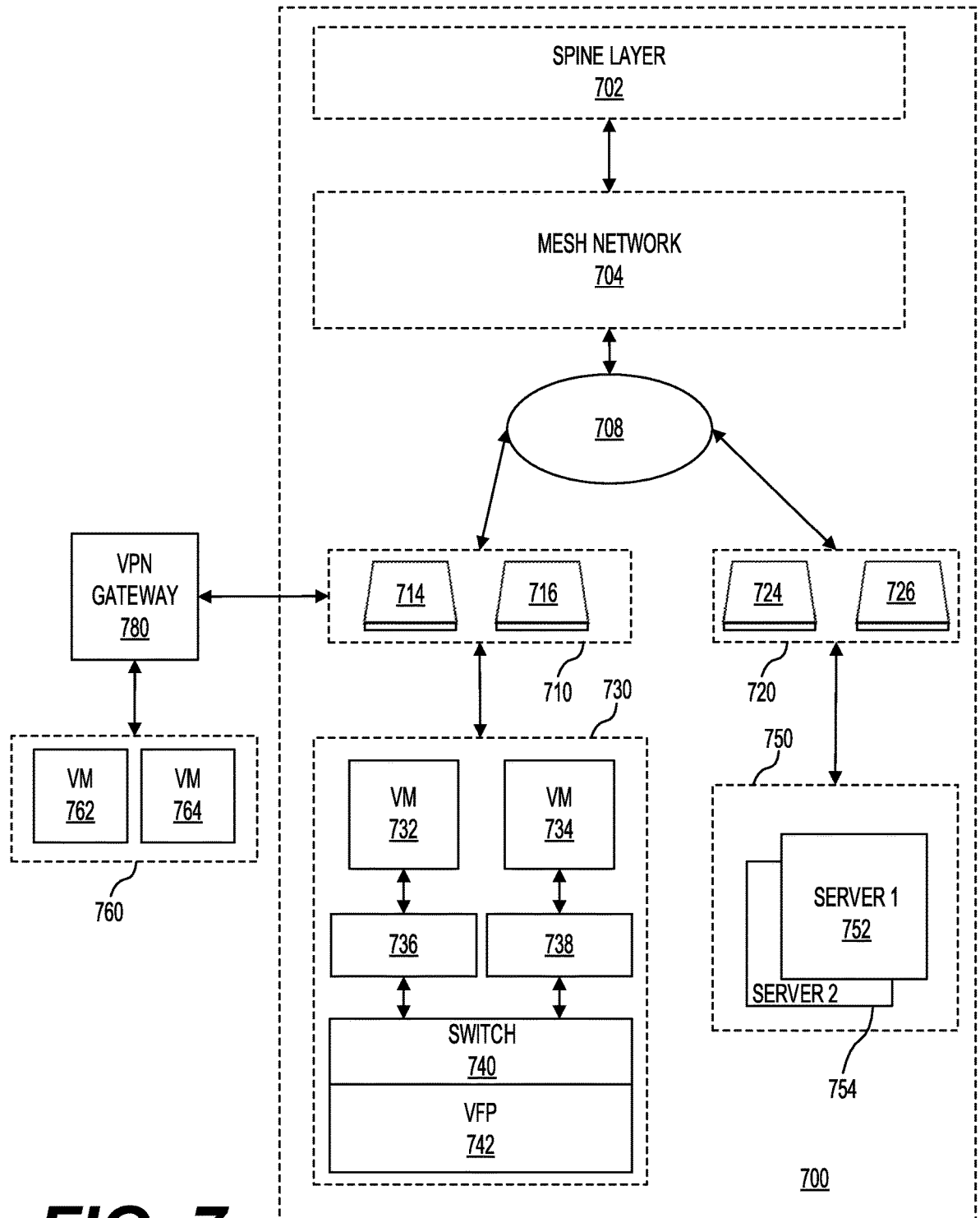
FIG. 7 shows a data center including a shared-tenancy hardware portion and a dedicated hardware portion coupled via a gateway in accordance with one example.

FIG. 7 shows a data center including a shared-tenancy hardware portion and a dedicated hardware portion coupled via a virtual private network (VPN) gateway 780 in accordance with one example. This example includes similar components as the example shown in FIG. 3. As example, VXLANs may be used to allow communication between shared-tenancy hardware portion 730 and dedicated hardware portion 750 in compliance with the requisite policies, In addition to these portions, this example includes virtual machines 762 and 764 that are located at a customer's premises 760 and not in the data center, but can access resources in a similar manner as described earlier with respect to FIG. 3, via VPN gateway 780. Data center 700 may include a spine layer 702 and a mesh network 704. As explained earlier with respect to FIG. 1, spine layer 702 may include switches connected to mesh network 704. Mesh network 704 may be connected to other routers and switches in the leaf layer including leaf layer portion 710 and leaf layer portion 720. Other types of switching arrangements may also be used to enable communication in data center 700. In this example, leaf layer portion 710 may include switches 714 and 716, which may be coupled to TOR switch 708, which may be coupled to mesh network 704. In addition, in this example, leaf layer portion 720 may include switches 724 and 726, which may also be coupled to TOR switch 708. In this example, like the example in FIG. 3, TOR switch 708 may present two switched virtual interfaces (SVIs). The two SVIs may be coupled to the switches in spine layer 702 via appropriate links or networks (e.g., mesh network 704).

With continued reference to FIG. 7, leaf layer portion 710 may be coupled to cloud portion 730 and leaf layer portion 720 may be coupled to cloud portion 750. In this example, cloud portion 730 may include hardware severs (e.g., in a portion of a data center or other such arrangements) that are managed and controlled by a cloud service provider and cloud portion 750 may include hardware servers (e.g., a portion of a data center or other such arrangements) managed and controlled by a third-party in agreement with the cloud service provider. Cloud portion 730 may include virtual machines (VMs) 732 and 734, which may be provisioned using hardware associated with cloud portion 730. Like as described earlier with respect to FIG. 3, each VM in data center 700 may have a corresponding IP address. Thus, VM 732 may correspond to IP address 192.168.10.3 and VM 734 may correspond to IP address 192.168.10.2. Each of these VMs may communicate with a switch (e.g., switch 740) using a network interface controller (NIC). Thus, VM 732 may be coupled to switch 740 via NIC 736 and VM 734 may be coupled to switch 740 via NIC 738. As noted earlier, switch 740 may be implemented as a Hyper-V Extensible Switch. Switch 740 may further be coupled a virtual filtering platform (VFP) 742. VFP 742 may operate as a packet filter such that VFP 742 may filter traffic from NIC 736 and NIC 738 to switch 740 and vice-versa. Each VM may be allowed to communicate with VMs in the same Virtual eXtensible Local Area Network (VXLAN) segment.

Still referring to FIG. 7, as described earlier with respect to FIG. 3, cloud portion 750 may include a sever 1 752 and a server 2 754. These servers may be coupled to leaf layer portion 720. These severs may correspond to dedicated hardware for a specific customer. In one example, a particular VXLAN segment may correspond to a virtual network (VNET) associated with the customer. Thus, the VNET may also be associated with a virtual network identifier (VNI). In addition, customer may have VMs 762 and 764 at its premises, which may be configured to communicate via VPN gateway 780. VPN gateway 780 may also correspond to a virtual network (VNET) associated with the specific customer. Thus, the VNET corresponding to VPN gateway 780 may also have a VNI.

Using similar functionality and steps as described with respect to FIGS. 3, FIG. 4A, and 4B, any of VM 762 and 764 may access files or other resources located at server 1 752 and sever 2 754. Thus, when VM 762 wants to send a packet to sever 1 352, the packet may be received by either of VM 732 or VM 734. VFP 742 may encapsulate this packet with a VXLAN header that includes the IP address of the host server (e.g., 10.100.2.4) as the source IP address and the IP address (e.g., 10.100.10.10) of TOR switch 708 as the destination IP address. TOR switch 708 may decapsulate the encapsulated packet and use the VNI in the packet to identify the virtual routing and forwarding (VRF) on the switch. TOR switch 708 may do this by mapping the VNI in the packet to the specific VRF artifact (e.g., a VRF table) for that customer. The VRF artifact may contain configuration specific to the customer's VNET. In the opposite direction, when sever 1 752 sends the packet to the VM (e.g., VM 762), it may tag the packet with a specific VXLAN tag. Once the packet reaches a TOR switch (e.g., TOR switch 708), it may use the VXLAN tag to find the VRF artifact, which contains the routes to the VM in the customer's VNET. Although FIG. 7 shows a certain number of components arranged in a certain manner, additional or fewer components may be included and they may be arranged differently.

FIG. 8 shows another flowchart 800 of a method for enforcing policies provided by the SDN controller in accordance with one example. In this example, this method may be performed in a distributed computing system including a shared-tenancy hardware portion and a dedicated hardware portion, where the shared-tenancy hardware portion may be coupled to the dedicated hardware portion via a top of rack (TOR) switch. As an example, this method may be performed in data center 700 and at VMs located at the customer's premises. Step 810 may include a controller configuring the TOR switch with at least one policy associated with a customer of the service provider, where the at least one policy comprises information related to the customer's ability to access the dedicated hardware portion. As an example, SDN controller 210 of FIG. 2 may be used to configure a TOR switch (e.g., TOR switch 708 of FIG. 7) with a policy associated with a customer's ability to access dedicated hardware (e.g., server 1 752 of FIG. 7).

Step 820 may include a first virtual machine, hosted by a host server in the shared-tenancy hardware portion, receiving at least one packet for transmission from a second virtual machine via a VPN gateway. As an example, VM 762 of FIG. 7 may create the packet for transmission to sever 1 352 of FIG. 7, which may be received by VM 732 of FIG. 7 via VPN gateway 780 of FIG. 7. The at least one packet may be similar in structure to original packet 410 of FIG. 4A.

Step 830 may include a virtual filtering platform, associated with the host server, encapsulating the at least one packet to generate at least one encapsulated packet comprising a virtual network identifier (VNI). As an example, VFP 742 of FIG. 7 may encapsulate original packet 410 to generate an encapsulated packet 420 of FIG. 4A including the VNI in VXLAN Header 424 field.

Step 840 may include the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware, and (3) transmitting the at least one decapsulated packet to the dedicated hardware portion based on the at least one policy. As an example, TOR switch 708 of FIG. 7 may receive the encapsulated packet and decapsulate the packet to create decapsulated packet 430 of FIG. 4. TOR switch 708 may further use the VNI in VXLAN Header 424 to identity the VRF artifact to determine a VLAN interface (e.g., an SVI) associated with the dedicated hardware (e.g., server 1 752 of FIG. 7). TOR switch 708 may further transmit the decapsulated packet to the dedicated hardware portion as long as the policy specified by the SDN controller allows such an action. This way, policies may be enforced, yet high throughput and low latency exchange of information may occur.

In conclusion, the present disclosure relates to a method in a distributed computing system, offered by a service provider, comprising a shared-tenancy hardware portion and a dedicated hardware portion, where the shared-tenancy hardware portion is coupled to the dedicated hardware portion via a top of rack (TOR) switch, where the distributed computing system further comprises a virtual machine, hosted by a host server in the shared-tenancy hardware portion. The method may include a virtual filtering platform, associated with the host server, encapsulating at least one packet, received from the virtual machine, to generate at least one encapsulated packet comprising a virtual network identifier (VNI). The method may further include the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware, and (3) transmitting the at least one decapsulated packet to the dedicated hardware portion based on at least one policy provided by a controller, where the at least one policy comprises information related to a customer of the service provider including information about the customer's ability to access the dedicated hardware portion.

The dedicated hardware portion may comprise at least one storage device comprising at least one file. The at least one policy may specify whether the customer can access the at least one file. The controller may be a software-defined network (SDN) controller. The at least one policy may specify a next hop route. The SDN controller may be configured to allocate a unique virtual network identifier to each virtual network associated with the TOR switch. The virtual routing and forwarding artifact may comprise configuration information specific to the customer.

In another aspect, the present disclosure relates to distributed computing system, which may be offered by a service provider. The distributed computing system may include a shared-tenancy hardware portion comprising a host server. The distributed computing system may further include a dedicated hardware portion comprising a baremetal server. The distributed computing system may further include a top of rack (TOR) switch configured to allow exchange of packets between the shared-tenancy hardware portion and the dedicated hardware portion, where the TOR switch is configured to allow the exchange of packets based on at least one policy specified by a controller associated with the shared-tenancy hardware portion. The distributed computing system may further include a virtual machine hosted by the host server configured to create at least one packet for transmission to the dedicated hardware portion. The distributed computing system may further include a virtual filtering platform, associated with the host server, configured to process the at least one packet and generate an encapsulated packet comprising a virtual network identifier (VNI). In the distributed computing system the TOR switch may further be configure to: (1) receive the at least one encapsulated packet and decapsulate the at least one encapsulated packet to create at least one decapsulated packet, (2) use the VNI to identify a virtual routing and forwarding artifact to determine a virtual local area network interface associated with the dedicated hardware, and (3) transmit the at least one decapsulated packet to the dedicated hardware portion based on the at least one policy.

With respect to the distributed computing system, the dedicated hardware portion may comprise at least one storage device comprising at least one file. The at least one policy may specify whether the customer can access the at least one file. The controller may be a software-defined network (SDN) controller. The at least one policy may specify a next hop route. The SDN controller may be configured to allocate a unique virtual network identifier to each virtual network associated with the TOR switch. The virtual routing and forwarding artifact may comprise configuration information specific to the customer.

In yet another aspect, the present disclosure relates to a method in a distributed computing system, offered by a service provider, comprising a shared-tenancy hardware portion and a dedicated hardware portion, where the shared-tenancy hardware portion is coupled to the dedicated hardware portion via a top of rack (TOR) switch, where the distributed computing system further comprises a first virtual machine, hosted by a host server in the shared-tenancy hardware portion, and a second virtual machine coupled to the first virtual machine via a virtual-private network (VPN) gateway. The method may include a virtual filtering platform, associated with the host server, encapsulating at least one packet, received from the first virtual machine, to generate at least one encapsulated packet comprising a virtual network identifier (VNI). The method may further include the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware, and (3) transmitting the at least one decapsulated packet to the dedicated hardware portion based on at least one policy provided by a controller, where the at least one policy comprises information related to a customer of the service provider including information about the customer's ability to access the dedicated hardware portion.

The dedicated hardware portion may comprise at least one storage device comprising at least one file. The at least one policy may specify whether the customer can access the at least one file. The controller may be a software-defined network (SDN) controller. The SDN controller may be configured to allocate a unique virtual network identifier to each virtual network associated with the TOR switch. The virtual routing and forwarding artifact may comprise configuration information specific to the customer.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a distributed computing system, offered by a service provider, comprising a shared-tenancy hardware portion and a dedicated hardware portion, wherein the shared-tenancy hardware portion is coupled to the dedicated hardware portion via a top of rack (TOR) switch, wherein the distributed computing system further comprises a virtual machine, hosted by a host server in the shared-tenancy hardware portion, the method comprising:
   a virtual filtering platform, associated with the host server, encapsulating at least one packet, received from the virtual machine, to generate at least one encapsulated packet comprising a virtual network identifier (VNI); and
   the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware portion, and (3) transmitting the at least one decapsulated packet to the dedicated hardware portion based on at least one policy provided by a controller, wherein the at least one policy comprises information related to a customer of the service provider including information about the customer's ability to access the dedicated hardware portion.

2. The method of claim 1, wherein the dedicated hardware portion comprises at least one storage device comprising at least one file.

3. The method of claim 2, wherein the at least one policy specifies whether the customer can access the at least one file.

4. The method of claim 1, wherein the controller comprises a software-defined network (SDN) controller.

5. The method of claim 1, wherein the at least one policy specifies a next hop route.

6. The method of claim 4, wherein the SDN controller is configured to allocate a unique virtual network identifier to each virtual network associated with the TOR switch.

7. The method of claim 1, wherein the virtual routing and forwarding artifact comprises configuration information specific to the customer.

8. A method in a distributed computing system, offered by a service provider, comprising a shared-tenancy hardware portion and a dedicated hardware portion, wherein the shared-tenancy hardware portion is coupled to the dedicated hardware portion via a top of rack (TOR) switch, wherein the distributed computing system further comprises a first virtual machine, hosted by a host server in the shared-tenancy hardware portion, and a second virtual machine coupled to the first virtual machine via a virtual-private network (VPN) gateway, the method comprising:
   a virtual filtering platform, associated with the host server, encapsulating at least one packet, received from the first virtual machine, to generate at least one encapsulated packet comprising a virtual network identifier (VNI); and
   the TOR switch: (1) receiving the at least one encapsulated packet and decapsulating the at least one encapsulated packet to create at least one decapsulated packet, (2) using the VNI to identify a virtual routing and forwarding artifact to determine a virtual local area network interface associated with the dedicated hardware portion, and (3) transmitting the at least one decapsulated packet to the dedicated hardware portion based on at least one policy provided by a controller, wherein the at least one policy comprises information related to a customer of the service provider including information about the customers ability to access the dedicated hardware portion.

9. The method of claim 8, wherein the dedicated hardware portion comprises at least one storage device comprising at least one file.

10. The method of claim 8, wherein the at least one policy specifies whether the customer can access the at least one file.

11. The method of claim 8, wherein the controller comprises a software-defined network (SDN) controller.

12. The method of claim 11, wherein the SDN controller is configured to allocate a unique virtual network identifier to each virtual network associated with the TOR switch, including a virtual network associated with the VPN gateway.

13. The method of claim 8, wherein the virtual routing and forwarding artifact comprises configuration information specific to the customer.

14. A distributed computing system, offered by a service provider, comprising:
   a shared-tenancy hardware portion comprising a host server;
   a dedicated hardware portion comprising a baremetal server;

a top of rack (TOR) switch configured to allow exchange of packets between the shared-tenancy hardware portion and the dedicated hardware portion, wherein the TOR switch is configured to allow the exchange of packets based on at least one policy specified by a controller associated with the shared-tenancy hardware portion;

a virtual machine hosted by the host server configured to create at least one packet for transmission to the dedicated hardware portion;

a virtual filtering platform, associated with the host server, configured to process the at least one packet and generate an encapsulated packet comprising a virtual network identifier (VNI); and wherein the TOR switch further configured to: (1) receive the at least one encapsulated packet and decapsulate the at least one encapsulated packet to create at least one decapsulated packet, (2) use the VNI to identify a virtual routing and forwarding artifact to determine a virtual local area network interface associated with the dedicated hardware portion, and (3) transmit the at least one decapsulated packet to the dedicated hardware portion based on the at least one policy.

15. The distributed computing system of claim 14, wherein the dedicated hardware portion comprises at least one storage device comprising at least one file.

16. The distributed computing system of claim 15, wherein the at least one policy specifies whether the customer can access the at least one file.

17. The distributed computing system of claim 14, wherein the controller comprises a software-defined network (SDN) controller.

18. The distributed computing system of claim 14, wherein the at least one policy specifies a next hop route.

19. The distributed computing system of claim 17, wherein the SDN controller is configured to allocate a unique virtual network identifier to each virtual network associated with the TOR switch.

20. The distributed computing system of claim 14, wherein the virtual routing and forwarding artifact comprises configuration information specific to the customer.

* * * * *